United States Patent [19]
Stessen et al.

[11] Patent Number: 5,389,859
[45] Date of Patent: Feb. 14, 1995

[54] DISPLAY DEVICE INCLUDING A CORRECTION CIRCUIT FOR CORRECTING A POSITION ERROR, AND CORRECTION CIRCUIT FOR USE IN SUCH A DISPLAY DEVICE

[75] Inventors: Jeroen H. Stessen; James J. A. McCormack, both of Eindhoven, Netherlands

[73] Assignee: U.S. Philips Corporation, New York, N.Y.

[21] Appl. No.: 124,119

[22] Filed: Sep. 20, 1993

[30] Foreign Application Priority Data

Sep. 22, 1992 [EP] European Pat. Off. ............ 92202900

[51] Int. Cl.⁶ .......................... G09G 1/04; H01J 29/74
[52] U.S. Cl. ................................ 315/370; 315/368.12; 315/367; 315/387
[58] Field of Search ................... 315/368.12, 367, 387, 315/389, 370

[56] References Cited

U.S. PATENT DOCUMENTS

| | | | |
|---|---|---|---|
| 4,463,288 | 7/1984 | Judd | 315/367 |
| 4,673,986 | 6/1987 | Jenness | 315/370 |
| 4,970,442 | 11/1990 | Harada | 315/367 |
| 4,992,706 | 2/1991 | Troemel et al. | 315/370 |
| 5,247,229 | 9/1993 | Ngo et al. | 315/387 |

FOREIGN PATENT DOCUMENTS

| | | | |
|---|---|---|---|
| 0110282 | 6/1984 | European Pat. Off. | H04N 3/22 |
| 0529570 | 3/1993 | European Pat. Off. | H04N 9/28 |

*Primary Examiner*—Gregory C. Issing
*Attorney, Agent, or Firm*—Edward W. Goodman

[57] ABSTRACT

A display device often includes a correction circuit for correcting a position error which is caused by the fact that the deflection signals are not (any longer) in conformity with the video signals to be displayed. This is caused, inter alia by the fact that the deflection coils and the display tube are not ideal. By providing the display device with a waveform generator generating a (line deflection) reference signal and by causing this reference signal to traverse the same "signal path" as the video signal, variations in the delay etc. can be corrected. Both the video signal and the reference signal are stored in a memory and read from the memory under the control of the correction circuit. Inputs of the correction circuit receive the (line deflection) reference signal delayed via the memory and a signal related to the (real) line deflection. With reference to these input signals, the correction circuit applies a (read) clock signal to the memory. As a result, deflection signals and video signals are always in conformity with each other.

6 Claims, 1 Drawing Sheet

DISPLAY DEVICE INCLUDING A CORRECTION CIRCUIT FOR CORRECTING A POSITION ERROR, AND CORRECTION CIRCUIT FOR USE IN SUCH A DISPLAY DEVICE

BACKGROUND OF THE INVENTION

1. Field of the Invention

The invention relates to a display device comprising a display tube for displaying video information, at least a line deflection coil and at least a field deflection coil, a deflection unit having a first output for applying a line deflection signal to the line deflection coil and a second output for applying a field deflection signal to the field deflection coil, a memory having an input for receiving and storing the video information under the control of a first clock signal and an output for reading the video information to be applied to the display tube under the control of a modulatable second clock signal, and a correction circuit for correcting a position error upon display of the video information on the display tube, with an input for receiving an input signal related to the line deflection current, said correction circuit comprising a modulatable clock generator for generating the second clock signal to be applied to the memory and an output for applying said second clock signal to the memory.

The invention also relates to a correction circuit for use in a display device.

2. Description of the Related Art

A display device and a correction circuit of this type are known from U.S. Pat. No. 4,673,986. In this known display device, a geometry model is used for the geometry correction, receiving a signal related to the line deflection current at a first input and a field deflection signal generated by the deflection unit at a second input. The geometry model determines the geometry-corrected deflection signals with reference to these input signals. In this known display device, a control signal for the modulatable clock generator is determined with reference to the line deflection signal generated by the deflection unit and a signal fed back via an output of the geometry model.

In the definition of a video signal (as transmitted), it is assumed that the picture to be displayed is scanned in an orthogonal pattern at a constant rate of the write spot (=the position where the electron beam impinges upon the phosphor layer). Theoretically, the line and field deflection fields are sawtooth-shaped, at 15625 Hz and 50 Hz, respectively. However, a rectangular picture will not be produced due to the shape of the display tube (too flat). The picture will be pincushion-distorted and the horizontal and vertical components of the spot rate will not be constant either. Other causes of the geometry errors are the position of the electron gun/-guns (too close to the display screen, or the display screen is "too flat"), the shape of the deflection fields of the line and field deflection coils, the variation of the deflection sensitivity due to a change of the EHT which results in a phenomenon referred to as breathing, and the non-ideal waveforms of the line and field deflection currents. The picture is then displayed in a geometrically distorted form.

The consistency of the spot rate is (always) improved by giving the currents a sinusoidal shape instead of a sawtooth shape, which is referred to as the S correction. However, since the horizontal deflection current has the shape of an attenuated sine, an (asymmetrical) linearity remains to be corrected. Thus, there will always be errors of a higher order which are still to be corrected.

Moreover, the geometry is disturbed because the line frequency of the incoming video signal is varied.

It is not easy to correct geometry errors by adapting the horizontal deflection current. In fact, very high voltages and very large currents occur in the line deflection circuit which produces much energy. Consequently, the current is difficult to influence and the components used are large, hot, expensive and vulnerable.

Another way of geometry correction is to refrain from correcting the deflection current (or currents) and to adapt the video signal instead, so that the correct information is written at the correct position.

Horizontal correction is most necessary and also easiest, because the information is then only to be shifted within one line. This is referred to as clock modulation. Alternatively, a new pixel content could be computed on the basis of the contents of a plurality of adjacent pixels, which is referred to as scan rate conversion.

In the circuit described in the above-mentioned Patent, a clock modulator is used in which the line deflection signal is applied in an unchanged (uncorrected) form to the line deflection coil. A signal related to the line deflection is applied to the correction circuit. With reference to this signal, with reference to the signal at the output of the (line) deflection unit and with reference to a hardware geometry model, the correction circuit determines a position error signal. This position error signal is applied as an input signal to the clock generator which determines the rate at which the video signal is read from the memory.

A drawback of this known correction circuit is that the geometry correction is carried out by means of an analog mathematical circuit generating two functions of the input signals. This is only possible in display tubes having very simple geometry errors so that this is not a realistic solution.

A further drawback is that the correction circuit in the known display device is inaccurate and expensive, and that the performance of the correction circuit is too much dependent on the elements of the correction circuit.

SUMMARY OF THE INVENTION

It is, inter alia, an object of the invention to provide a display device and a correction circuit which do not have the above-mentioned drawbacks. To this end, a display device according to the invention is characterized in that the display device includes a waveform generator for generating a reference signal related to the line deflection signal, and in that the memory has a section for storing the reference signal under the control of the first clock signal and for reading the reference signal modulated with the second clock signal from the memory under the control of the second clock signal, said modulated reference signal being applied as second input signal to the correction circuit.

Advantages of the display device according to the invention are, inter alia that a plurality of large-signal components (=non-integrable components) is replaced by small-signal components (integrable), which results in a reduction of costs, greater reliability and less power dissipation and requires less space in the display device.

A further advantage of a small-signal solution is that this solution is more flexible because the required correction can be programmed.

An embodiment of a display device according to the invention is characterized in that the correction circuit is adapted to apply a control signal to the modulatable clock generator in dependence upon the two input signals.

An advantage thereof is that the modulatable clock generator is incorporated in the feedback loop, so that it is not necessary to impose strict requirements on the reliability of the characteristics of the modulatable clock generator.

A further embodiment of a display device according to the invention is characterized in that the correction circuit comprises a differential amplifier having two inputs for receiving the two input signals and an output for applying the control signal to the modulatable clock generator.

A further embodiment of a display device according to the invention is characterized in that the waveform generator is also adapted to generate the field deflection signal which is written into the memory under the control of the first clock signal via an extra input of the memory and, while being modulated with the second clock signal, is read from the memory and applied to the field deflection coil. A current amplifier will generally be arranged between the memory and the field deflection coil.

BRIEF DESCRIPTION OF THE DRAWING

These and other aspects of the invention will be apparent from and elucidated with reference to the embodiments described hereinafter.

In the drawing.

DESCRIPTION OF THE PREFERRED EMBODIMENT

Figure 1:
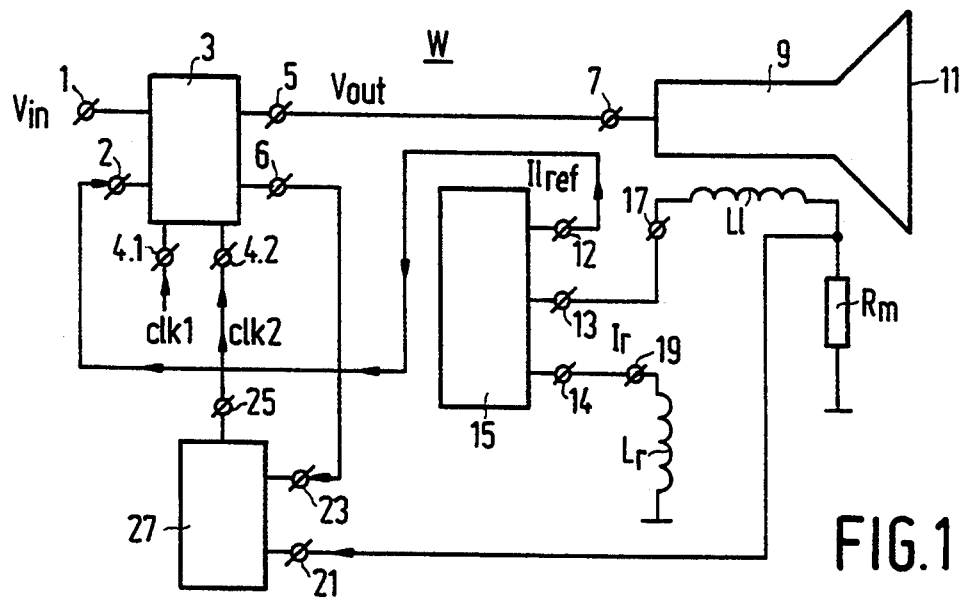
FIG. 1 shows an embodiment of a display device according to the invention.

FIG. 1 shows a display device W having an input 1 for receiving an input video signal $V_{in}$. This may be, for example a YUV signal or an RGB signal. The input 1 is then a triple input. A memory 3 is connected to the input 1. The memory stores the (input) video signal under the control of a first clock signal clk1 applied to an input 4.1. Subsequently, the (output) video signal $V_{out}$ is read (after some time) under the control of a second clock signal clk2 applied to an input 4.2 and supplied at an output 5. The memory 3 comprises, for example two line memories, with a video line being written into the one line memory (under the control of the first clock signal) when the previous video line is read from the other line memory (under the control of the second clock signal). Instead of line memories, the memory 3 may alternatively comprise, for example field memories. Video information can be written and read simultaneously by implementing the memory as an asynchronous dual port memory. The output 5 of the memory is coupled to a control electrode 7 of a display tube 9 (three in a color display tube). The video signal is displayed on a display screen 11 of the display tube. The display tube generates an electron beam/beams at an intensity which is dependent on the video signal $V_{out}$. As is common practice, this (these) electron beam(s) are deflected by means of (a) line deflection coil(s) $L_l$ and (a) field deflection coil(s) $L_r$. The line deflection coil and the field deflection coil are coupled to output terminals 13 and 14, respectively, of a deflection unit 15 for receiving a line deflection signal and a field deflection signal at terminals 17 and 19, respectively. The line and field deflection signals may be corrected for EHT variations, but this will not be further explained.

One side of the line deflection coil remote from the terminal 17 is coupled to a measuring resistor $R_m$. A measuring transformer may alternatively be used instead of a resistor. The junction point of the line deflection coil and the measuring resistor is coupled to an input 21 of a correction circuit 27. The line deflection circuit is shown in greater detail in FIG. 2.

An output terminal 12 of the deflection unit 15 (which output terminal supplies a line deflection current reference signal $Il_{ref}$) is also coupled to a second input 2 of the memory 3. The signal at the input 2 is written into the memory under the control of the first clock signal clk1 and subsequently read under the control of the second clock signal clk2 and supplied at an output 6. This output is connected to a second input 23 of the correction circuit 27. The correction circuit determines and generates a modulated clock signal with reference to the two input signals (at inputs 21 and 23) and supplies this clock signal at an output 25 as the second clock signal clk2 at the input 4.2 of the memory 3. The modulation of the second clock signal then depends on the necessary geometry correction.

In many cases, the first clock signal clk1 will be generated by a clock generator which is controlled by a horizontal and a vertical synchronizing signal (not shown in FIG. 1).

Figure 2:
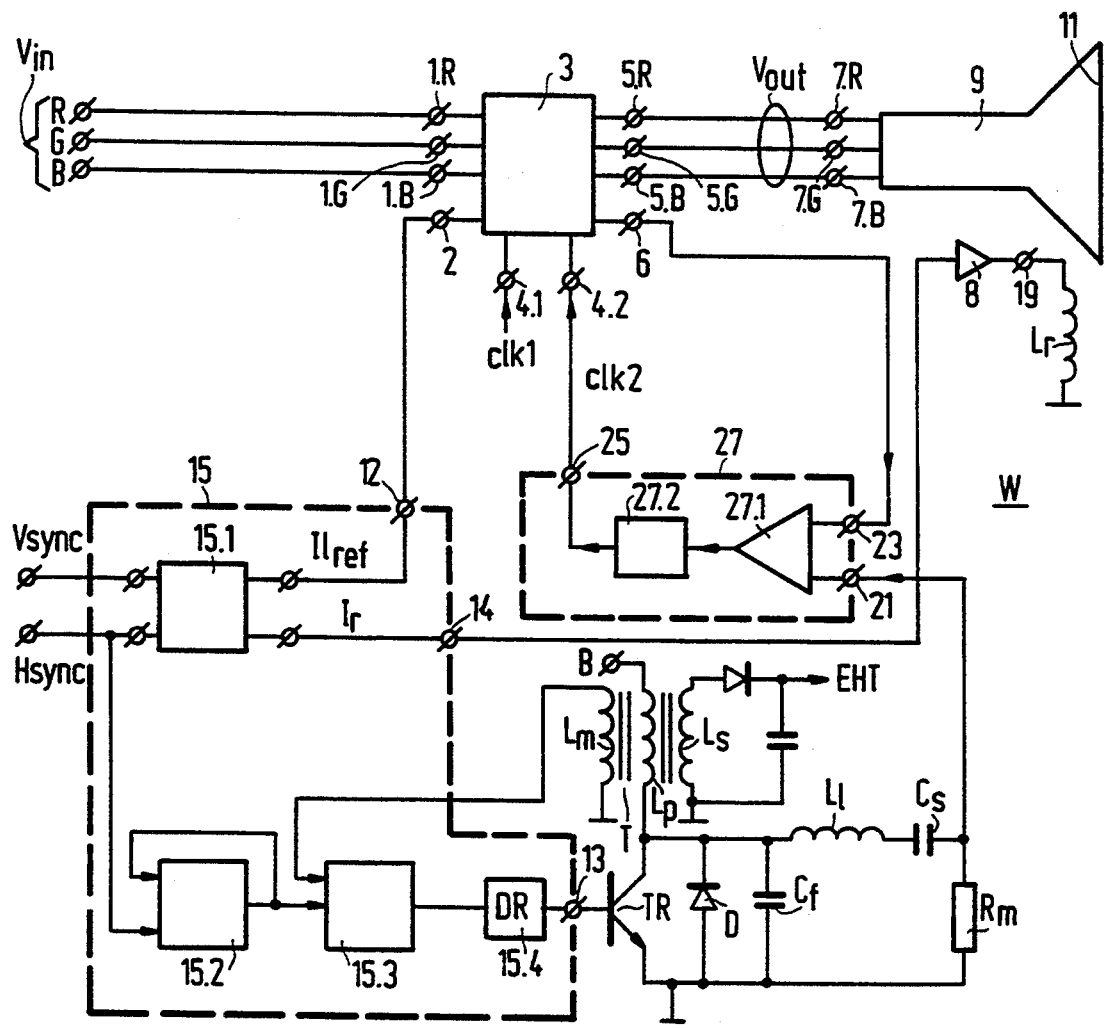
FIG. 2 shows an embodiment of a display device in greater detail.

The deflection unit 15 will substantially always be controlled by a synchronizing signal (horizontal (line) and vertical (field) synchronizing signal, not shown in FIG. 1, see FIG. 2 for more details).

FIG. 2 shows an embodiment of a display device W in greater detail. Elements denoted by the same reference numerals as in FIG. 1 have corresponding functions.

The input video signal $V_{in}$ is split up in this embodiment into the usual three components R, G and B and the memory now has three inputs 1.R, 1.G and 1.B for receiving the video signal. Similarly as in Fig. 1, the video signal is written under the control of the first clock signal clk1, which clock signal is applied to the input 4.1 of the memory 3.

Under the control of the second clock signal clk2 (from the correction circuit 27) video information $V_{out}$ is read and supplied at three outputs 5.R, 5.G and 5.B, while the video information is displayed on the display tube. These three outputs are connected to three control electrodes 7. R, 7. G and 7.B of the display tube 9.

The display device W not only receives the (input) video signal $V_{in}$ but also a horizontal (line) synchronizing signal Hsync and a vertical (field) synchronizing signal Vsync. These synchronizing signals are applied to the deflection unit 15. The deflection unit comprises a waveform generator 15.1 for generating a line deflection current reference signal $Il_{ref}$ under the control of the horizontal synchronizing signal and the vertical synchronizing signal, which reference signal is applied to the input 2 of the memory 3 via the output 12 of the deflection unit. A second output of the waveform generator 15.1 supplies a field deflection signal $I_r$ which is applied to the terminal 19 of the field deflection coil $L_r$ via the output 14 of the deflection unit 15 and an output amplifier 8. The waveform generator 15.1 may have, for example, a facility for determining the ideal horizontal and vertical deflection signals for the display tube 9 used in the display device W, dependent on the type of display tube used. The waveform generator may also ensure, for example a (possibly) required east-west modulation.

The horizontal synchronizing signal Hsync is also applied to a first phase-locked loop 15.2 (PLL, for example, having a large time constant). A second input of the first phase-locked loop receives a signal from the output (of this loop). The output of the first phase-locked loop is also connected to a first input of a second phase-locked loop 15.3 (PLL having a smaller time constant than the first phase-locked loop), which loop has a second input connected to a measuring coil $L_m$. The measuring coil has its other terminal connected to a ground reference. Instead of the measuring coil $L_m$, the second input of the second phase-locked loop 15.3 may be connected to the primary winding of the transformer T. The output of the second phase-locked loop is coupled to the output 13 of the deflection unit 15 via a control circuit 15.4. The output 13 is connected to a line deflection transistor TR. The emitter of the transistor is connected to the ground reference. The collector of the transistor is connected to a primary winding $L_p$ of a transformer T, which primary winding has its other end connected to a voltage source B. The primary winding $L_p$ and the measuring coil $L_m$ are wound, for example on the same core so as to obtain a retrace signal as the second input signal of the second phase-locked loop.

The secondary winding of the transformer T may be used, for example for generating the EHT required for the display tube 9. In an embodiment in which the EHT is generated separately, the transformer will be replaced by a simple coil, as is common practice.

As is usual in a line deflection circuit, a freewheel diode D and a retrace capacitor $C_f$ are connected across the transistor TR. The line deflection coil $L_l$, a trace capacitor $C_s$ (S correction capacitor) and the measuring resistor $R_m$ are connected in series to the junction point of the collector of the transistor TR and the primary winding $L_p$, while a terminal of the measuring resistor which is not connected to the trace capacitor is connected to the ground reference.

The line deflection coil $L_l$ may comprise, for example, two separate coils and is substantially always connected to the neck of the display tube 9. For the sake of simplicity, the line deflection coil is not shown proximate to the display tube in this embodiment.

The junction point of the trace capacitor $C_s$ and the measuring resistor $R_m$ is connected to the input 21 of the correction circuit 27. The input 23 of the correction circuit 27 receives the modulated signal from the output 6 of the memory 3. The inputs 21 and 23 are connected to two inputs of a differential amplifier 27.1, an output of which supplies the amplified difference of the two input signals to a control input of a voltage-controlled oscillator 27.2 (VCO). The output of the voltage-controlled oscillator is connected to the output 25 of the correction circuit, which output supplies the second clock signal clk2 and is connected to the input 4.2 of the memory 3.

The operation of the correction circuit 27 will now be described in greater detail. The horizontal current reference signal $Il_{ref}$ generated by the waveform generator 15.1 is subjected to the same delays etc. as the incoming video signal $V_{in}$. If these signals ($Il_{ref}$, $I_r$ and R, G and B) could be directly applied to the display tube, there would be a geometrically perfect picture on the display screen. Instead, the signals (a three-channel video signal R, G and B and the horizontal current reference signal $Il_{ref}$) are applied to the tour inputs (1.R, 1.G, 1.B and 2) of the memory (for example, an asynchronous dual port memory). Here they are written at a constant clock (the first clock signal clk1) (for example, synchronized with the synchronizing signals). At the outputs 5.R, 5.G, 5.B and 6 of the memory these four signals are supplied after some time as output video signal $V_{out}$ and as a modulated reference signal. The timing of these signals combined is now dependent on the modulatable read clock frequency (the second clock signal clk2). The output 13 of the deflection unit furnishes a line deflection signal for the line deflection transistor.

In accordance with the present invention, the current reference signal distorted (delayed) by the memory and the real deflection current are compared with each other (by a control means or, for example, by a differential amplifier) and the frequency of the read clock (the second clock signal clk2) is corrected by means of, for example a voltage-controlled oscillator (VCO) in such a way that the difference between these two current signals is minimal. The modulated current reference signal and the deflection current will thereby be equal. Since the video signal and the current reference signal are still in conformity with each other as regards timing after they have been processed in the memory, the video signal is now also in conformity with the real deflection current. The picture geometry is then perfect (at least if $Il_{ref}$ is perfect).

The quality of the horizontal geometry correction is now independent of the real waveform of the horizontal deflection current. In principle, all circuit elements for the correction of this current may thus be dispensed with.

The phase of the real deflection current with respect to the incoming video signal is optimally adjusted in such a way that, on average, the memory is half filled. Since this phase cannot be influenced rapidly (the line deflection circuit is slow), it is possible to instantaneously deviate therefrom. With a satisfactory control and provided that it is large enough, the memory can also correct these time base errors.

Several modifications are possible. The output clock may also be generated without a voltage-controlled oscillator, for example by a comparator. This comparator supplies a pulse (edge) whenever the difference between the two signals has become too large. The closed control loop can then react maximally fast.

The horizontal current reference signal, which is first locked with the synchronizing signal of the incoming video signal and is generated and subsequently distorted (modulated) via the memory (for example, an asynchronous dual port memory) so as to relate it to the read clock of the memory, may alternatively be directly generated from the last-mentioned clock.

Another embodiment of a correction circuit 27 for use in a display device according to the invention is a comparator whose inputs receive the respective line deflection signals and the reference signal delayed in the memory and whose output supplies a clock signal which is applied to the memory. In this circuit this comparator operates as a self-oscillating circuit and generates a clock signal due to the action of the comparator.

In the embodiments described and shown in the Figures, the memory is always shown with two clock inputs. Instead, it is alternatively possible to use a memory having address inputs and to apply the clock signals to the memory via counters. It is further irrelevant for the invention whether the memory is either a digital or an analog memory.

It is also possible to choose a random access memory (RAM) instead of (less expensive) sequentially accessible memories (such as delay lines etc.).

Instead of modulating the output clock signal (the second clock signal clk2), it is also possible to modulate the input clock (the first clock signal clk1) of the memory or to modulate the two clock signals in opposite senses.

All the signals $Il_{ref}$ and $I_r$ have corrections for realizing a geometrically perfect picture, including a possible correction for load variations of the EHT, which is a phenomenon referred to as "breathing".

Corrections in connection with deviations in the shape of the line deflection current are automatically realized so that the shape of the line deflection current is no longer relevant. Existing correction elements may optionally be either maintained or removed.

We claim:

1. A display device comprising a display tube for displaying video information, at least a line deflection coil and at least a field deflection coil, a deflection unit having a first output for applying a line deflection signal to the line deflection coil and a second output for applying a field deflection signal to the field deflection coil, a memory having an input for receiving and storing the video information under the control of a first clock signal and an output for reading the video information to be applied to the display tube under the control of a modulatable second clock signal, and a correction circuit for correcting a position error upon display of the video information on the display tube, with an input for receiving an input signal related to the line deflection current, said correction circuit comprising a modulatable clock generator for generating the second clock signal to be applied to the memory and an output for applying said second clock signal to the memory, characterized in that the display device includes a waveform generator for generating a reference signal related to the line deflection signal, and in that the memory has a section for storing the reference signal under the control of the first clock signal and for reading the reference signal modulated with the second clock signal from the memory under the control of the second clock signal, said modulated reference signal being applied as second input signal to the correction circuit.

2. A display device as claimed in claim 1, characterized in that the correction circuit is adapted to apply a control signal to the modulatable clock generator in dependence upon the two input signals.

3. A display device as claimed in claim 2, characterized in that the correction circuit comprises a differential amplifier having two inputs for receiving the two input signals and an output for applying the control signal to the modulatable clock generator.

4. A display device as claimed in claim 1, characterized in that the waveform generator is also adapted to generate the field deflection signal which is written into the memory under the control of the first clock signal via an extra input of the memory and, while being modulated with the second clock signal, is read from the memory and applied to the field deflection coil.

5. A display device as claimed in claim 2, characterized in that the waveform generator is also adapted to generate the field deflection signal which is written into the memory under the control of the first clock signal via an extra input of the memory and, while being modulated with the second clock signal, is read from the memory and applied to the field deflection coil.

6. A display device as claimed in claim 3, characterized in that the waveform generator is also adapted to generate the field deflection signal which is written into the memory under the control of the first clock signal via an extra input of the memory and, while being modulated with the second clock signal, is read from the memory and applied to the field deflection coil.

* * * * *